July 18, 1939.                T. L. HOLLISTER                2,166,591
                              STATION EQUIPMENT
                           Filed Oct. 28, 1937            2 Sheets-Sheet 2
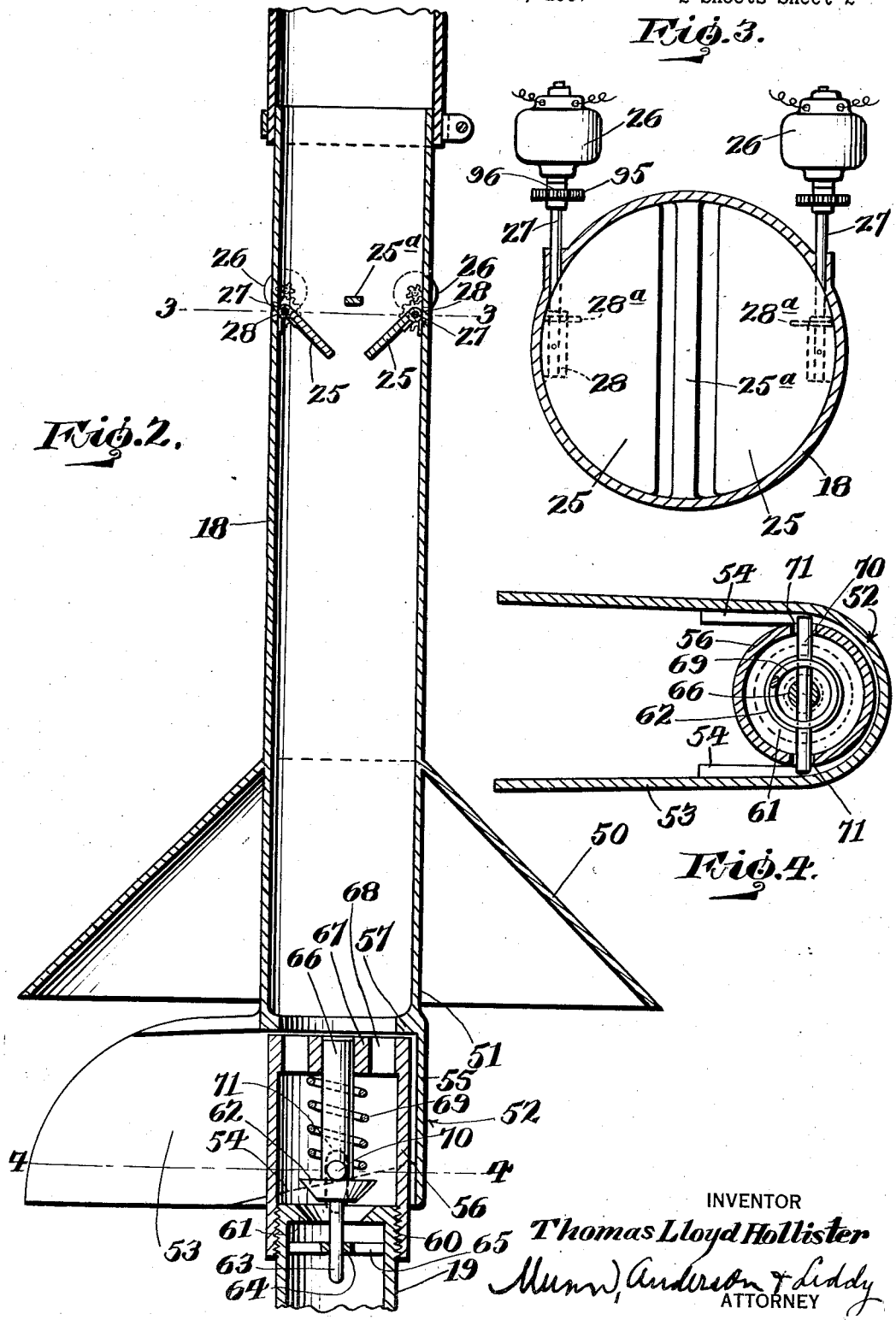
INVENTOR
Thomas Lloyd Hollister
ATTORNEY Patented July 18, 1939

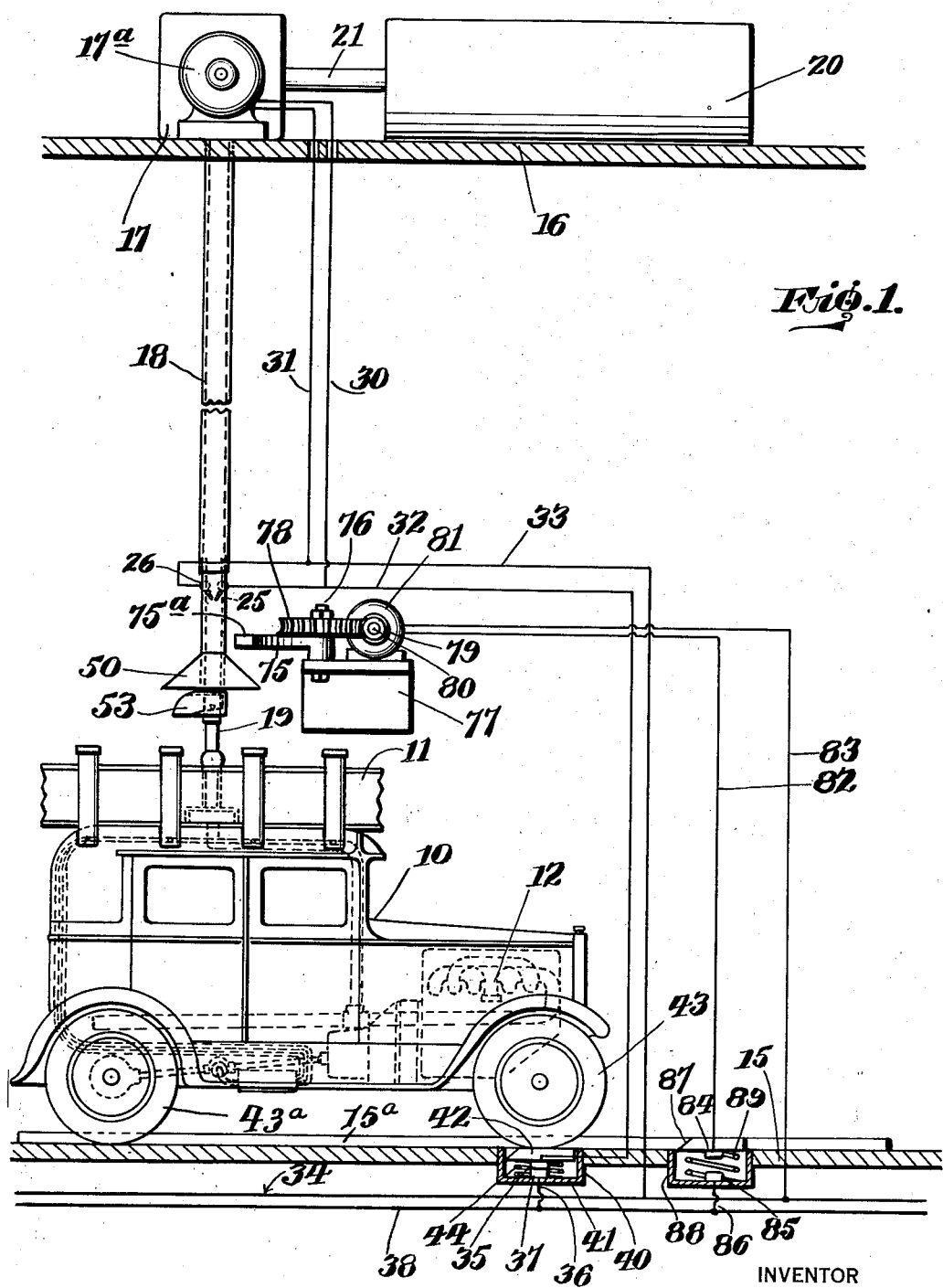

2,166,591

UNITED STATES PATENT OFFICE 2,166,591

STATION EQUIPMENT

Thomas Lloyd Hollister, Miami, Fla.

Application October 28, 1937, Serial No. 171,601

8 Claims. (Cl. 104—52)

This invention relates to a station equipped to remove exhaust gases stored in a tank on an automobile.

An object of the invention is the provision of a station equipment for withdrawing exhaust gases from an automobile or storage tank in which an exhaust pipe projects from the tank and is provided with a discharge valve which is adapted to be automatically opened when the automobile moves into the station and when the exhaust pipe moves into cooperative relationship with the free end of a tube, a suction pump being connected with the tube having a valve therein for closing the tube to the atmosphere, a suction pump being operated by an electric motor which is in electric circuit that also includes a motor for opening the valve in the tube, a switch controlling the opening or closing of the circuit and operated by means which is set in motion when the front wheels of the automobile engage an element connected with said means.

Another object of the invention is the provision of a station equpment for withdrawing exhaust gases from an automobile storage tank provided with an exhaust pipe in which is mounted a discharge valve, said valve and the outer free end of the exhaust pipe being adapted to be moved into cooperative relationship with the free end of a suction tube with means on the discharge valve and the tube for causing automatic opening of the valve whereby the exhaust pipe is placed in communication with the suction tube, means being employed for moving the tube away from the exhaust pipe when the automobile is moved to a predetermined position from its initial position where the exhaust pipe was in communication with the tube.

A further object of the invention is the provision of a station equipment for withdrawing exhaust gases from an automobile storage tank in which an exhaust pipe connected with a tank is adapted to be moved into cooperative relationship with a swingable tube of the station, means being employed for creating a suction in the tube and separate means being provided for opening a valve in the tube, an electric circuit controlling the operation of the actuation of the operating means for the valve in the tube and the suction means, said circuit being closed automatically by a movable element adapted to be engaged by the front wheels of the automobile.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a view in elevation showing a station equipment with an automobile supplied with a tank adapted to collect exhaust gases at times from the exhaust pipe of the internal combustion engine which propels the vehicle.

Figure 2 is a vertical section with the lower end of the suction tube and exhaust pipe respectively connected with the station and with the automobile, Figure 3 is a horizontal section taken along the line 3—3 of Figure 2, and Figure 4 is a horizontal section taken along the line 4—4 of Figure 2.

Referring more particularly to the drawings, 10 generally designates an automobile which has mounted on the top thereof a collapsible container 11 described and claimed in my co-pending application Serial No. 156,404, filed July 29, 1937. The tank or container 11 is adapted to be expanded for withdrawing exhaust gases from the exhaust pipe of the engine 12 at times when the automobile is passing through crowded sections of a city or town and this tank is adapted to store these gases until the automobile arrives at a station equipped to remove exhaust gases from the container 11 at which time the container is contracted by a mechanism set in operation by the operator of the car.

The station contains a ground floor 15 and an upper floor 16. A suction pump 17 is mounted upon the upper floor and a tube 18 extends through the floor 16 from the pump 17 down to a point adjacent the upper end of an exhaust pipe 19 which is connected with the tank 11.

A storage tank 20 is also mounted upon the upper floor 16 and is in communication with the suction pump 17 by means of a pipe 21. The exhaust gases are drawn through the swingable tube 18 from the container 11 and stored in the tank 20.

The exhaust gases which are stored in the tank 20 may be utilized for other purposes by a process of refinement at the station.

The tube 18 adjacent its lower end is provided with a pair of pivotally mounted valves 25 which are operated by electric motors 26 through shafts 27. These shafts are directly connected with the valves 25 at their hinged portions 28.

An electric motor 17a, which is included in the suction pump 17 and operates said pump, is included in the same electric circuit with the motors 26. This circuit includes wires 30, 31 which lead respectively to the wires 32 and 33. The wire 33 is connected with a wire 34 below the floor 15 and forms part of the house circuit. The wire 32 is connected with a switch element 35 and a wire 36. A second switch element 37 connected with a wire 38 forms the other lead of the house circuit.

The switch elements 35 and 37 are located within a housing 40 embedded in the floor 15. The element 37 is secured to the bottom 41 of the housing 40 while the element 35 is connected with a depressible block 42. The block has its edges guided by the side walls of the housing 40 and normally stands slightly above the upper end of the housing and is slightly above the floor 15 so that it may be engaged by a front wheel 43 of the automobile 10. A spring 44 resting upon the bottom 41 of the housing 40 normally urges the block 42 in its uppermost position for maintaining the contact 35 out of engagement with the contact 37 so that the circuit to the motors 26 and the motor which operates the suction pump will be open.

The wheels 43 and 43a are guided along a predetermined path by tracks 15a mounted upon the floor 15.

The lower end of the tube 18 is provided with an apron 50 which is conically-shaped with the wider end of the apron embracing the lower end 51 of the tube 18 and is adapted to collect any exhaust gases which may escape from the upper end of the exhaust pipe 19. The extreme lower end of the pipe 18 which projects below the lower edge of the apron 50 is provided with a receiving member or hood, generally designated by the numeral 52. This receiving member is provided with side flanges 53 and a cam surface 54 for a purpose which will be presently described. The back portion 55 of the member 52 is rounded to neatly fit a rounded valve cage 56 on the upper end of the exhaust pipe 19. The end of the tube 18 is provided with an annular flange 57 which is adapted to engage the upper end of the valve cage 56.

The valve cage 56 is threaded at 60 onto the upper free end of the exhaust pipe 19 which has a valve seat 61 to receive a spring-pressed valve 62 that normally maintains the outer end of the exhaust pipe 19 closed against escape of exhaust gases from the tank 11.

The valve 62 is provided with a stem 63 operating in a guide 64 carried by a web 65 formed integrally with the upper end of the exhaust pipe 19. Said valve is also provided with a stem 66 operating in a guide 67 carried by a web 68 formed at the upper end of the valve cage 56. A coil spring 69 embraces the valve stem 66 and is located between the valve 62 and the guide 67 for urging the valve 62 onto its seat 61.

A pin 70 which has its ends carried by slots or guides 71 at diametrically opposite points in the valve cage 56 is received transversely by an opening in the valve stem 66. This pin is adapted to ride upon the cam surfaces 54 in the hood 52 when the valve cage 56 at the upper end of the exhaust pipe 19 moves into the hood for raising the valve 62 off its seat 61.

An arm 75 is rigidly connected with a shaft 76 carried by a bracket 77 which is secured to a fixed support in the neighborhood of the swingable tube 18.

A gear 78 is secured to the shaft 76 and meshes with a gear 79 carried by a shaft 80 and this shaft is rotated by an electric motor 81.

The motor 81 is in the electric circuit which includes wires 82 and 83, the contact members 84, 85, wires 86, 34 and 38.

The contact member 84 is secured to the bottom face of a depressible member 87 while contact 85 is secured upon the bottom of a housing 88 mounted in the floor 15. A spring 89 located in the housing maintains the depressible member 87 in its normal inoperative position.

The operation of my device is as follows: In my co-pending application I have described and claimed an automobile having a compressible and expansible storage tank which is adapted to receive the exhaust gases from the engine during those times when the automobile is traveling through crowded sections of a community in order to prevent pollution of the air. At spaced points in such community are located a number of stations where the driver of the automobile may stop his car and have the exhaust gases removed from the storage tank and these gases are then collected in large drums and they may be treated mechanically or chemically and put in such condition that they may be suitable for commercial purposes.

As described in my co-pending application the operator of the vehicle can control at will the expansion or contraction of the storage tank for exhaust gases on his vehicle although when he arrives at the station he will move along a predetermined path so that the valve cage 56 will move into the hood 52 whereby the valve cage will be automatically seated in alignment with the lower end of the suction tube 18.

As the valve cage moves into the hood the opposite ends of the pin 70 will ride along the cam surface 54 and force the valve 62 from its seat 61 and against the tension of the spring 69 so that when the valve cage is properly seated within the hood said valve will be opened.

At this time the front wheels 43 will reach the depressible block 42 and cause the contact 35 to move into engagement with the contact 37 and thus close the circuit to the motors 26 whereby the valves 25 will be moved to open position and away from the centrally disposed bar 25a. At the same time the circuit to the motor which controls the suction pump 17 will also be closed and the suction pump will draw the exhaust gases from the container 11 through the pipe 19 and tube 18. These exhaust gases are then forced through the pipe 21 into one of the storage tanks 20 at the station. Any number of tanks may be employed at the station for collecting the exhaust gases and these tanks may be connected together and controlled by valves so that the tanks may be automatically filled.

When the tank 11 has been freed of its exhaust gases the driver of the automobile will cause the vehicle to be propelled forwardly so that the wheels 43 will move away from the depressed block 42 whence the spring 44 will move the block to its normal inoperative position and move the contacts 35 and 37 away from each other. When this happens the circuit to the motors 26 will be broken and coil springs 28a will move the valve 25 to closed position where the inner free edges of the valves will engage the bar 25a.

However, as the vehicle moves forwardly, the valve casing 56 pushes on the hood 52, forcing the lower end of the flexibly supported pipe 18 to the right in Fig. 1 until the pipe is in a position to be engaged by the arm 75. When the casing 56 is about to leave the hood 52, the hook 75a will have come into engagement with the pipe 18 and move the lower end of the pipe clear of the casing and since the movement of the arm has a greater speed of movement than the vehicle at this time, the free end of the tube will clear the upper end of the exhaust pipe 19.

The forward movement of the vehicle will cause the wheels 43 to engage the depressible block 84 whence the circuit to the motor 81 will be closed so that the gear 78 will be revolved as well as the arm 75 and the hook portion 75a of this arm will engage the front portion of the swingable tube 18 and force said tube at its lower end rearwardly and away from the valve casing 56. The wheels of the vehicle, however, merely pass over the block 84 so that the motor is only revolved temporarily but rapidly for causing the arm 75 to swing through a small arc for moving the tube 18 away from the casing. As soon as the wheels leave the block 87 it is restored to its normal position and the circuit to the motor 81 is then broken. Since the tube 18 is of great length, possibly fifty feet or more, its weight will act on the arm 75 and swing it back to an inoperative position. On the other hand a spring if desired may be connected with the arm 75 so that the motor 81 will move the arm 75 against the tension of the spring but when the motor has ceased to function the spring will return the arm to its normal inoperative position.

The shaft 27 which operates the valve 25 may be an extension of the motor shaft or the motor shaft may be provided with a gear 95 meshing with a gear 96 which is secured to the shaft 27.

I claim:

1. A station equipment for withdrawing exhaust gases from an automobile storage tank provided with a discharge valve, said equipment comprising a tube, a suction pump connected with the tube, a valve in the tube closing the tube to prevent back flow of the exhaust gases to the station, an electric motor for operating the valve in the tube, an electric motor for operating the pump, an electric circuit for the motors, a switch controlling the circuit, and means set in motion by the wheels of the automobile when entering the station for closing the switch for causing operation of the motors, means for causing the moving automobile to align the discharge valve with one end of the tube, and means causing opening of the discharge valve when said valve aligns with the end of the tube.

2. A station equipment for withdrawing exhaust gases from an automobile storage tank provided with a discharge valve, said equipment comprising a tube, a suction pump connected with the tube, a valve in the tube closing the tube to prevent back flow of the exhaust gases to the station, an electric motor for operating the valve in the tube, an electric motor for operating the pump, an electric circuit for the motors, a switch controlling the circuit, means set in motion by the wheels of the automobile when entering the station for closing the switch for causing operation of the motors, operating means on the discharge valve, means on the tube adapted to be engaged by the operating means on the discharge valve for causing opening of the discharge valve, and means for causing the moving automobile to align the discharge valve with one end of the tube.

3. A station equipment for withdrawing exhaust gases from an automobile storage tank provided with an exhaust pipe having a discharge valve, said equipment comprising a tube, a suction pump connected with the tube, a valve in the tube for closing the tube to prevent back flow of the exhaust gases to the station, an electric motor for operating the valve in the tube, an electric motor for operating the pump, an electric circuit for the motors, a switch controlling the circuit, means set in motion by the wheels of the automobile when entering the station for closing the switch for causing operation of the motors, the end of the pipe and discharge valve being carried by the automobile into operative relation with the lower end of the suction tube, means for causing the moving automobile to align the discharge valve with one end of the tube, and cooperating means on the discharge valve and tube for causing automatic opening of said valve when said valve is moved into the tube.

4. A station equipment for withdrawing exhaust gases from an automobile storage tank provided with an exhaust pipe having a discharge valve, said equipment comprising a tube, a suction pump connected with the tube, an electric motor for operating the pump, valves for closing the tube to prevent back flow of the exhaust gases to the station, electric motors for opening the valves, a circuit including all of said motors, a switch mounted in the floor of the station, means actuated by the wheels of a moving vehicle for closing the switch, a hood on the end of the tube adapted to receive the discharge valve and cause the exhaust pipe to aline with the tube at the time when the switch is closed, means for causing the moving automobile to align the discharge valve with the hood, and means for causing opening of the discharge valve when said valve moves into the hood.

5. A station equipment for withdrawing exhaust gases from an automobile storage tank provided with an exhaust pipe having a discharge valve, said equipment comprising a tube, a suction pump connected with the tube, an electric motor for operating the pump, valves for closing the tube to prevent back flow of the exhaust gases to the station, electric motors for opening the valves, a circuit including all of said motors, a switch mounted in the floor of the station, means actuated by the wheels of a moving vehicle for closing the switch, a hood on the end of the tube adapted to receive the discharge valve and cause the exhaust pipe to aline with the tube at the time when the switch is closed, and means caused to be set in motion by the vehicle when the vehicle is advanced beyond said switch for moving the tube and hood away from the exhaust valve, means for causing the moving automobile to align the discharge valve with the hood, and means for causing opening of the discharge valve when said valve moves into the hood.

6. A station equipment for withdrawing exhaust gases from an automobile storage tank provided with an exhaust pipe having a discharge valve, said equipment comprising a tube, a suction pump connected with the tube, an electric motor for operating the pump, valves for closing the tube to prevent back flow of the exhaust gases to the station, electric motors for opening the valves, a circuit including all of said motors, a switch mounted in the floor of the station, means actuated by the wheels of a moving vehicle for closing the switch, a hood on the end of the tube adapted to receive the discharge valve and cause the exhaust pipe to aline with the tube at the time when the switch is closed, said tube being flexible and movable away from a vertical position, means for causing the moving automobile to align the discharge valve with the hood, and means for causing opening of the discharge valve when said valve moves into the hood.

7. A station equipment for withdrawing exhaust gases from an automobile storage tank provided with a discharge valve, said equipment comprising a tube, said discharge valve adapted to be aligned with the free end of the tube, a suction pump connected with the tube, an electric motor for operating the pump, an electric circuit for the motor, a switch controlling the circuit, and means set in motion by a wheel of the automobile for causing closing of the switch and operation of the motor, means causing the automobile to align the discharge valve with an end of the tube, and means causing opening of the discharge valve when the said valve moves into operative relation with the tube.

8. A station equipment for withdrawing exhaust gases from an automobile storage tank provided with a discharge valve, said equipment comprising a tube, said discharge valve adapted to be aligned with the free end of the tube, a suction pump connected with the tube, an electric motor for operating the pump, an electric circuit for the motor, a switch controlling the circuit, means set in motion by a wheel of the automobile for causing closing of the switch and operation of the motor, means causing the automobile to align the discharge valve with an end of the tube, and means causing opening of the discharge valve when the said valve moves into operative relation with the tube, and a depressible block located in the path of an advancing automobile, said switch actuated by the block for closing the circuit to the motor at the time when the discharge valve has alined with the tube.

THOMAS LLOYD HOLLISTER.